United States Patent [19]

Siol et al.

[11] Patent Number: 4,965,783
[45] Date of Patent: Oct. 23, 1990

[54] COMPATIBLE POLYMERS, AND USE OF SAME FOR REGISTERING OPTICALLY READABLE INFORMATION

[75] Inventors: Werner Siol, Darmstadt-Eberstadt; Ulrich Terbrack, Reinheim, both of Fed. Rep. of Germany

[73] Assignee: Rohm GmbH Chemische Fabrik, Darmstadt, Fed. Rep. of Germany

[21] Appl. No.: 161,035

[22] Filed: Feb. 26, 1988

[30] Foreign Application Priority Data

Mar. 16, 1987 [DE] Fed. Rep. of Germany ....... 3708428

[51] Int. Cl.⁵ ............................................. G11B 7/00
[52] U.S. Cl. .................................. 369/100; 369/275.2
[58] Field of Search ...................... 369/100, 275, 284; 346/1.1, 15, 135.1; 365/106, 112, 126; 430/19, 945; 503/208; 525/200; 350/353

[56] References Cited

U.S. PATENT DOCUMENTS

| | | | |
|---|---|---|---|
| 4,635,245 | 1/1987 | Smith | 369/100 |
| 4,722,595 | 2/1988 | Siol | 369/100 |
| 4,731,417 | 3/1988 | Miyata et al. | 525/200 |
| 4,734,359 | 3/1988 | Oguchi et al. | 346/135.1 |
| 4,757,492 | 7/1988 | Fukushima et al. | 369/100 |
| 4,777,492 | 10/1988 | Ohnishi et al. | 346/1.1 |

FOREIGN PATENT DOCUMENTS 61-295076 12/1986 Japan .

*Primary Examiner*—Donald McElheny, Jr.
*Attorney, Agent, or Firm*—Oblon, Spivak, McClelland, Maier & Neustadt

[57] ABSTRACT

The invention relates to a method for recording, storing, and displaying optically readable information in a medium, with the use of a plastic material which can be modified in an optically differentiable way under the action of thermal energy or a form of energy directly convertible into thermal energy. In the method, a polyblend is employed which is comprised of at least two disparate polymers and which are mutually compatible, and which polyblend has an upper critical solution temperature (UCST), whereby an optically differentiable modification of the information storage medium is brought about by the phase transformation from a compatible polyblend above the UCST to the deblended polymers (P1, P2) below the UCST, or the reverse of this transformation.

75 Claims, 5 Drawing Sheets

COMPATIBLE POLYMERS, AND USE OF SAME FOR REGISTERING OPTICALLY READABLE INFORMATION

BACKGROUND OF THE INVENTION

1. Field Of the Invention

The invention relates to compatible polymers which demonstrate the phenomenon of "upper critical solution temperature" (UCST), and use of same for registering optically readable information.

2. Discussion of the Background

From Eur. OS 0 177 063, a method is known for recording, storing, and displaying optically readable information in a material medium, wherewith a polyblend P comprised of two disparate but mutually compatible polymers P1 and P2 is employed, said mixture having a lower critical solution temperature (LCST), wherewith an optically differentiable modification of the information storage medium is effected by a phase transformation from a compatible polymer blend (polyblend) below the LCST to de-blended polymers P1 and P2 above the LCST, or by the reverse of this transformation.

There are literature reports of data storage with mixtures of polyvinylidene fluoride and polymethyl methacrylate (PVDF/PMMA) employed as a substrate medium (see 1985 *Plastic Industry News*, 31 (11)).

In general, it may fairly be stated that the following 1947 statement of Dobry remains valid: "In polyblends miscibility is the exception and immiscibility is the rule." (Dobry, A. and Boyer-Kawenoki, F., 1947, *J. Polym. Sci.*, 1: 90.) However, in the meantime a number of compatible polyblends have been described which are comprised of disparate polymers. (See Olabisi, O., Robeson, L. M., and Shaw, M. T., 1979, "Polymer-polymer miscibility", pub. Academic Press; and 1982 Kirk-Othmer, Encyclopedia of Chemical Technology, 3rd Ed., Vol. 18, 443-478, pub. John Wiley.) The above-recited state of the art also points out means of employing such polyblends with LCST as, e.g., data storage media, and for self-darkening window glazing.

From theoretical considerations (Flory-Theorie, lattice theory), the existence of an LCST and a UCST may be deduced. (See "Kirk-Othmer", loc. cit., pp. 446, 460–547; Olabisi et al., loc. cit.)

The LCST of polyblend systems represents a phenomenon whereby a "cloud point" occurs upon heating; i.e., as temperature is increased a temperature threshold is passed at which the polyblend re-separates into two mutually incompatible polymer phases.

The UCST is characterized by phase separation in a polyblend system at a lower temperature, and development of miscibility (formation of a single phase) at higher temperature.

Recently a number of polymer systems have been discovered which display LCST behavior. In the monograph of Olabisi et al., loc. cit., 267–268, the following is stated:

"This chapter clearly shows that LCST behavior is definitely more common than UCST behavior in polymer blends; therefore increasing the temperature decreases the miscibility."

The UCST phenomenon has been described in a number of publications, e.g., for styrene/butadiene/rubber mixtures (Ougizawa, T., et al., 1985, *Macromolecules*, 18, 2089); for polystyrene/poly-o-chlorostyrene (Zacharius, S. L., et al., 1984, *Adv. Chem. Ser.*, 206; and 1983, *Macromolecules*, 16(3):381); for blends of polystyrene and polystyrene/4-bromostyrene copolymer (Strobel, G. R., et al., 1986, *Macromolecules*, 19(11):2683; and Kambour, R. P., et al., 1986, *Marcomolecules*, 19(11):2679); for systems comprised of polystyrene and butadiene-methylstyrene copolymer (Kuleznev, V. eN., et al., see CA 102:185811f); for blends of chlorinated polyethylene and PMMA (Walsh, D. J., et al., 1981, *Polymer*, (22/8):1005); for blends of PVC and PMMA (see Cnalykh, A. E., et al., CA 94:176033t); for blends of high molecular weight chlorinated polyethylenes (Ueda, H., et al., 1985, *Macromolecules*, 18(12):2719); and for blends of certain methyl-substituted polystyrenes and polystyrene (Sillescu et al., 1986, *Macromol. Chem. Rapid Commun.*, 7:415–419).

Further, UCST behavior is known for blends of polystyrene and carboxylated poly(2,6-dimethyl-1,4phenylene oxide) (see Cong, G., et al., 1986, *Macromolecules*, 19(11):2765); for blends of polystyrene and poly(vinyl methyl ether) (Kwei, T. K., et al., 1974, *Marcomolecules*, 7, 667); for blends of PMMA and PVC (Razinskaya, I. N., see CA 104:110546f); for blends of PVC and block copolymers of polybutylene terephthalate and polytetrahydrofuran (Nishi, T., et al., 1975, *I. Appl. Phys.*,46, 4157); and for blends of disparate acrylonitrile-styrene copolymers (Ougizawa, T., et al., see CA 105:983235).

UCST behavior has also been reported for blends of deuterated and normal polymer species (see Bates, F. S., et al, 1986, *Marcomolecules*, 19(7):1938; and Yang, H., et al., 1986, *Polym. Commun.*, 27(5):132).

The cited publications are primarily concerned with theoretical aspects of the polymer chemical and physical behavior of these polyblends. The statement of Olabisi et al., from "Polymer-polymer miscibility", loc. cit., p. 322, is applicable: "In terms of property enhancement of specific polymer blends, miscibility per se is not a criterion for utility."

In acrylate chemistry, the basic orientation is that of little prospect of finding compatible polymer blends. Thus, Olabisi et al., loc. cit., pp. 233-238 summarize the known results for poly(meth)acrylates as follows: "The available experience indicates that the various members of the acrylate family are not miscible."

Thus, the prospects of finding polyblends with UCST behavior, and with phase behavior useful for specific industrial or technical purposes, are extremely poor.

However, contrary to the teaching of the literature, acrylate chemistry does in fact include a large number of compatible polyblends, as will be discussed below; and many of these display UCST behavior. Further, it has been discovered that UCST behavior is not confined to polymers of a specific low molecular weight, but may also occur when one of the two polymers is crosslinked.

There is a demand for optical data storage devices, particularly devices which allow erasure of stored data and reuse of the memory capability. The object is to achieve a memory material which memory is maximally insensitive to spurious influences, is uncomplicated in operation, and is inexpensive to manufacture. Further, there is a demand for storage media systems which are reversible, and in particular are reversible at relatively low temperatures. The specific processing conditions should not have a limiting effect on the properties of the memory; i.e., such effects should be minimized.

SUMMARY OF THE INVENTION

Accordingly, one object of the present invention is to provide optical data storage devices which allow the erasure of stored data and are reusable.

Another object of the invention is to provide a stable memory material which is uncomplicated in operation, inexpensive to manufacture and reversible at relatively low temperatures.

These and other objects of the invention which will become apparent from the following specification have been achieved by the present method for recording, storing and displaying optically readable information in a plastic material which can be modified in an optically differentiable way under the action of thermal energy or a form of energy directly convertible into thermal energy, comprising the steps of:

preparing a plastic material comprising a polyblend, said polyblend comprising at least two disparate polymers which are mutually compatible, said polyblend having an upper critical solution temperature UCST; and modifying said plastic material in an optically differentiable manner to store information by inducing a phase transformation from a compatible single-phase system above the UCST to a de-blended two-phase system of the disparate polymers below the UCST, or inducing the reverse phase transformation from said de-blended system to said compatible system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
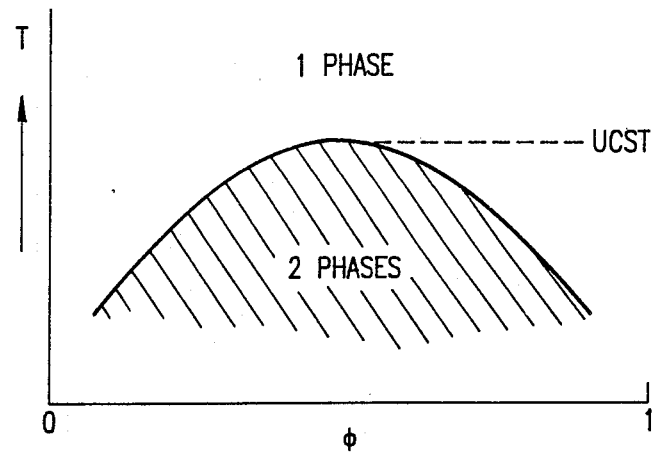
FIG. 1 is a phase diagram of a compatible polyblend with a USCT (the abscissa is the volume fraction of the polymer P1 in the mixture)
Figure 6:
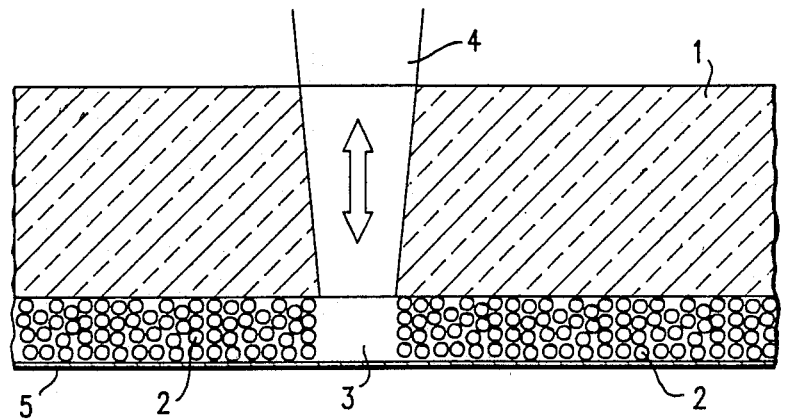
FIG. 6 illustrates an information recording disk having a multi-layered structure. Writing-in of information is effected by laser, in this way dissolving boundaries between individual light scattering particles to form a homogeneous polymer mixture. Reading-out is also performed by using laser light (disk substrate (1), de-blended polymer mixture (2), homogeneous polymer mixture (3), laser beam for writing-in and reading-out (4), aluminum layer (5))

It has been discovered, in connection with the present invention, that polymer blends with UCST are suitable as material for recording, storing, and displaying optically readable information.

The invention concerns polymer blends (polyblends) with UCST in suitable configurations as material media for optically readable information; and it further concerns devices for recording, storing, and displaying optically readable information, which contain such polymer blends in suitable configurations.

The invention further concerns a method of recording, storing, and displaying optically readable information in a medium, with the use of a polymer blend as an information storage medium, which blend is comprised of at least two disparate polymers P1 and P2 which are mutually compatible, and which blend has a UCST, whereby an optically differentiable modification of the information storage medium is brought about by the phase transformation from a de-blended system of the polymers (P1, P2) below the UCST to a compatible polymer system above the UCST, or the reverse of this transformation.

In general, the UCST of the inventively employed polymer blends is in the range $-50°$ to $+300°$ C. Preferably, the UCST matches the specific application envisioned. Thus, an information system employed as a cold-warning placard will have a UCST of c. $0°$ C.; whereas a data storage system preferably should have a UCST $>100°$ C.

The Polymer Blend (PB):

As stated above, the property of having a UCST is an essential condition in the context of the invention, for the polymer blend to serve as a material medium for registering optically readable information. The compatible polymer blends (PBs) according to the invention are comprised of at least two disparate polymer species, P1 and P2. Candidates for such blends include the abovementioned blends with UCST behavior, e.g. those mentioned in the discussion of the background.

Such blends have, for example, the following composition:

I-A: 1-99 parts by wt. of a polymer "P1-A" of styrene; and

II-A: 99-1 parts by wt. of a polymer "P2-A" comprised of:

(i) Monomers of formula

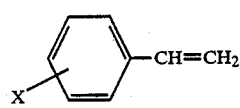

where X represents chlorine, bromine, or methyl; or (ii) Carboxylated poly(2,6-dimethyl-1,4phenylene oxide).

Alternatively, the blends have the following composition:

I-B: 1–99 parts by wt. of a polymer "P1-B", comprised of chlorinated olefins such as chlorinated polyethylene or PVC; and II-B: 99–1 parts by wt. of a polymer "P2-B", comprised of various high molecular weight chlorinated polyethylenes which differ in chlorine content from P1B.

Less suitable are blends of polystyrene (P1) and polyvinyl methyl ether (P2). The UCST with such blends can be clearly detected only in the presence of solvents (see Cowie, J.M.G., and Saeki, S., 1981, Polymer Bulletin, 6, 75–80).

It has further been discovered that compatible polyblends having the following composition, under the conditions stated below, may be used to solve the problems set forth above:

I-C: 1–99 parts by wt. of a polymer "P1-C", comprised of monomers of formula

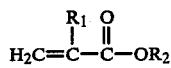

where R1 represents hydrogen or methyl, and R2 represents an ethyl group or a hydrocarbon group with 4–30, preferably 4–24, carbon atoms; and II-C: 99–1 parts by wt. of a polymer "P2-C" (disparate from P1-C), comprised of monomers of formula

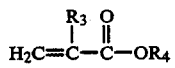

where R3 represents hydrogen or methyl, and R4 represents an ethyl group or a carbohydrate group with 4–30, preferably 4–24, carbon atoms; subject to the following conditions:

(a) The sum of (I)+(II)=100 wt.%;

(b) If R2 and R4 are the same, then R1 and R3 are different, and if R1 and R3 are the same, then R2 and R4 are different;

(c) The groups R2 and R4 have comparable van der Waals volumes, i.e., so that components I-C and II-C have comparable volumes.

These compatible blends PB-C are generally distinguished by having a UCST, and may be advantageously employed for optical data storage. The polyblends PB-C are the subjects of a pending Ger. Pat. App., No. P 37 08 427.5.

Particularly noteworthy are the polyblends "PB-C" (PB-C1 to PB-C13) listed in the following Table 1:

TABLE 1

| Compatible polyblends, "PB-C": | | | | |
|---|---|---|---|---|
| P1-C | | P2-C | | |
| R1 | R2 | R3 | R4 | |
| CH3 | Ethyl | H | Ethyl | PB-C1 |
| CH3 | n-Butyl | H | n-Butyl | PB-C2 |
| CH3 | iso-Butyl | H | iso-Butyl | PB-C3 |
| CH3 | Cyclohexyl | H | Cyclohexyl | PB-C4 |
| CH3 | n-Decyl | H | n-Decyl | PB-C5 |
| CH3 | 3,3,5-Trimethyl-cyclohexyl | H | 3,3,5-Trimethyl-cyclohexyl | PB-C6 |
| CH3 | 2-Ethylhexyl | H | 2-Ethylhexyl | PB-C7 |
| CH3 | n-Butyl | H | iso-Butyl | PB-C8 |
| CH3 | iso-Butyl | H | n-Butyl | PB-C9 |
| CH3 | iso-Butyl | CH3 | n-Butyl | PB-C10 |
| CH3 | n-Butyl | CH3 | iso-Butyl | PB-C11 |
| CH3 | Phenyl | CH3 | Cyclohexyl | PB-C12 |

TABLE 1-continued

| Compatible polyblends, "PB-C": | | | | |
|---|---|---|---|---|
| P1-C | | P2-C | | |
| R1 | R2 | R3 | R4 | |
| CH3 | Phenyl | H | Cyclohexyl | PB-C13 |

With regard to PB-C6, PB-C12, and PB-C13 in the Table, these are so compatible that it is advantageous for applications according to the invention if one copolymerizes at least one of the two polymers with a disparate monomer, whereby the compatibility is reduced and the UCST is raised.

Criteria of Compatibility:

The inventive polyblends (PBs) are characterized by being compatible at a higher temperature and incompatible at lower temperatures (thus they display UCST behavior). In the context of the present invention and contrary to the concepts adhered to in conventional polymer chemistry practice, the term "compatible" applied to a blend of polymers P1 and P2 will be understood to mean a homogeneous mixture which macroscopically displays the properties of a single-phase material (see "Kirk-Othmer", loc. cit., Vol. 18, pp. 446, 457–460; and Brandrup and Immergut, 1975, "Polymer handbook", 2nd Ed., pub. Wiley Interscience, p. III-211).

The following will be regarded as criteria for the compatibility. (These depart from the criteria adopted in the standard texts.)

(I) Observation of the glass temperature, Tg.

To the extent that the polymer components have glass temperatures which differ from each other sufficiently to be differentiable by differential scanning calorimetry (DSC), dilatometry, dielectric measurements, or radioluminescence spectroscopy, compatibility will be evidenced by a shift in or disappearance of the Tg's of the individual polymeric components (see Olabisi et al., "Polymerpolymer miscibility", loc. cit., pp. 21, 123).

(II) The "optical method".

A film is cast from a homogeneous solution of the polymer components, and the film is dried and examined. Even under magnification, no optically discernible inhomogeneity is present, if the blend is compatible.

Thus, the inventively employed polyblends for display and storage of optically readable information are single-phase materials at increased temperature, and are two-phase materials at lower temperature. The phase diagram of such a polyblend with a UCST is illustrated in FIG. 1.

Thus, the invention relates to polyblends (PBs) with UCST, said blends being employed in a suitable configuration as material media for registering optically readable information. The invention further relates to a method of recording, storing, and displaying optically readable information, whereby an optically differentiable modification of the PB is brought about by the phase transformation from a deblended system of the polymers (P1, P2) below the UCST to a compatible polymer system above the UCST, or the reverse of this transformation. An important precondition is, of course, that the transformation be optically detectable, i.e. that the polymers P1 and P2 differ in index of refraction (RI). Preferably the RIs of the polymer components P1 and P2 differ by 0.005, more preferably by 0.01, and particularly preferably by at least 0.02. As mentioned above, most of the known compatible polyblends can be identified as such by specific interactions between the polymers (see Barlow, J. W. and Paul, D. R., 1981, *Annu. Rev. Mater. Sci.*, 299-319); or such strong repellent forces are present within a copolymer P1 that when the copolymer P1 is mixed with a polymer P2 these forces are reduced, in which case one refers to "miscibility windows" for certain compositions of the copolymer P1 (see Pfennig, J.-L. G., et al., 1985, *Macromolecules*, 18, 1937-1940). There is also exothermal miscibility here, leading to LCST behavior (compatibility at low temperatures and phase separation at higher temperatures).

The inventively employed polyblends behave differently than this. They show compatibility at higher temperatures, and incompatibility at low temperatures (UCST behavior, as illustrated in FIG. 1).

In contrast to polyblends with LCST behavior, in the past the polyblends with UCST behavior, which are employed in the invention, have been examined only infrequently.

Thus, in Welsh, D. J., Higgins, J. S., and Maconnachie, A., 1985, "Polymer blends and mixtures", Martinus Nijhoff Pubs., Boston, p. 2, it is stated, "LCST behavior is rather common in polymer blends while UCST behavior is usually limited to cases where miscibility is the result of the Low molecular weight of the components, e.g. mixtures of oligomers."

According to this statement, UCST behavior in polyblends is limited to cases of low molecular weight polymers P1 and P2.

As mentioned above, the authors have discovered, surprisingly, in connection with the invention, that the inventive polyblends display compatibility with UCST behavior even if the polymers have quite high molecular weights. Further, UCST behavior has been observed in the inventive polyblends even when one of the two polymers used has been crosslinked.

The thermodynamic conditions for miscibility are as follows:

$$\Delta G_{mix} = \Delta H_{mix} - T\Delta S_{mix}$$

is subject to the conditions $$\Delta G_{mix} < 0 \text{ and } \left(\frac{\partial^2 \Delta G_{mix}}{\partial \phi_1^2}\right)_{t,p} > 0$$

for the inventive polyblends with UCST behavior. Thus it is clear that, due to the similar structures of P1 (e.g. poly-n-butylmethacrylate) and P2 (e.g. poly-n-butylacrylate), one cannot expect an exothermic specific interaction (with $\Delta H_{mix} << 0$). Rather, it is expected that $\Delta G_{mix} < 0$ will be due to a positive entropy of mixing, $\Delta S_{mix} > 0$. This indicates that the compatibility of polymers PL and P2 pertains particularly at higher temperatures, with the UCST behavior attributable to the attendant increase in the term $T\Delta S_{mixl}$.

Eq. (L) above may be written as $$\Delta G_{mix} = \Delta H_{mix} - T(\Delta S_{mix}^{comb.} + \Delta S_{mix}^{excess}).$$

The entropy of mixing $\Delta S_{mix}$ can thus be broken down into a combinatorial part, $\Delta S_{mix}^{comb.}$, and an excess part $\Delta S_{mix}^{excess}$. (In this connection, see Barlow, J. W., and Paul, D. R., loc. cit., pg. 300.) As mentioned above, the compatibility of the inventive polyblends is not limited to low molecular weights, and miscibility has been observed even with one of the two polymers being crosslinked. Therefore the compatibility cannot be solely due to the combinatorial entropy, but in the present case of compatible polyblends one expects a positive excess entropy. Conventionally this is explained as the effect of the free volume. This has little of use to offer the practitioner.

Figure 2:
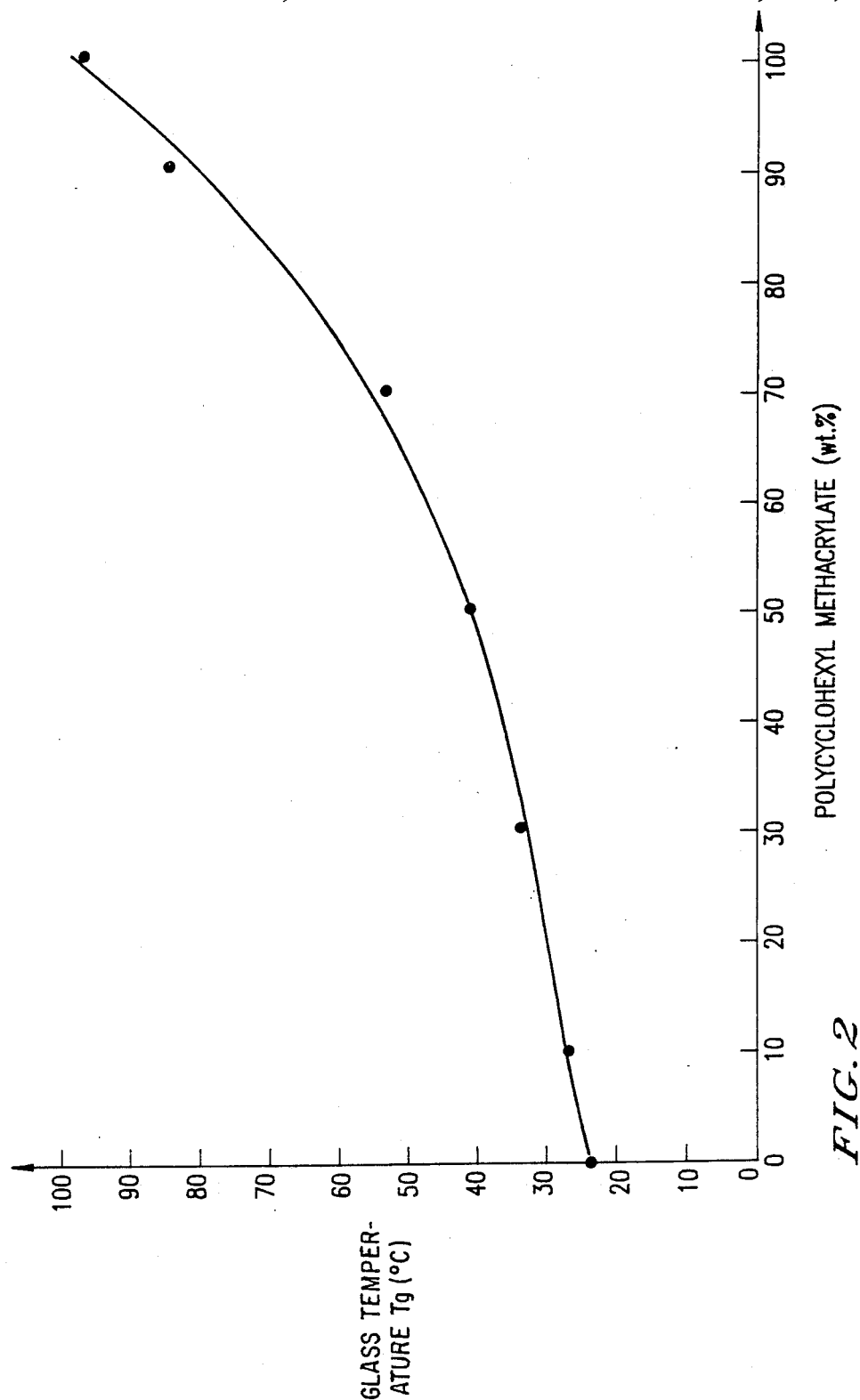
FIG. 2 is a graph of the glass transition temperature Tg as a function of composition, for polymer blend PB-C4.

The general rule for compatibility of polymers P1 and P2 may be stated as follows: Compatibility is displayed particularly when the mobility of the polymers is increased upon mixing. This is also expressed by the lowering of the glass temperature of the mixture (see FIG. 2). In the above formulas, this is always the case for (R1 = H and R2 = CH$_3$), if R2 = R4; thus if a polyacrylate is mixed with the corresponding polymethacrylate. The effect is pronounced if R2 (=R4) is a sterically hindered group, e.g. a cycloalkyl group. One experiences particularly good results, e.g., if R2 (and R4) is a 3,3,5-trimethylcyclohexyl group.

In contrast, the polyblend PB-C7 (poly-2-ethylhexmethacrylate/poly-2-ethylhexylacrylate) displays compatibility only at elevated temperatures (see Table 1). The same is true of polyblend PB-C5 (with R2 = R4 = decyl).

Accordingly, groups R2 which are sterically hindered are particularly preferred, of types which, for example, in combination with R1 = CH$_3$ give particularly rigid polymers. Apparently this results in a possible substantial increase in chain mobility when the polymer is mixed with the corresponding acrylate (with R3 = H and R4 = R2), rendering miscibility possible in many cases even at room temperatures.

However, the groups R2 and R4 need not be identical. It suffices that they correspond well in size and shape. Poly-i-butylmethacrylate and poly-n-butylacrylate have also been observed to be compatible (PB-C9, Table 1). In this connection, as a general rule, there is incompatibility if R2 and R4 differ by more than 2 carbon atoms. As a rule, for a difference of more than 1 carbon atom the compatibility is much less. Particularly preferred are blends wherein R2 and R4 have the same number of carbon atoms. The blend PB-C1 in Table 1 is a special case, in that as a rule R2 and R4 should be large enough so that the difference R1 = H, R2 = CH$_3$ is not a major factor. In particular, as a rule R2 and R4 should each have at least 4 carbon atoms.

In addition to the abovementioned polyblends with UCST (see also Table 2), which are thoroughly adequate for the inventive application for registering optically readable information, according to the following general rule there are other compatible polyblends which are candidates for the inventive application. These will be designated polyblends "PB-D". They are comprised of: I-D:1-99 wt.% of a polymer comprised of the following units ("formula PI-D") to a substantial extent, i.e. >50 wt.%, preferably >80 wt.%, particularly preferably >99 wt.%:

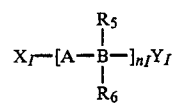

and

II-D: 99-1 wt.% of a polymer comprised of the following blocks ("formula PII-D") to a substantial extent, i.e. >50 wt.%, preferably >80 wt.%, particularly preferably >99 wt.%:

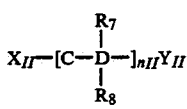

where n represents the degree of polymerization;

$X_I$ and $X_{II}$ represent the polymer chain initiating groups, e.g. initiator groups, or $C_{12}H_{25}S$ groups; and $Y_I$ and $Y_{II}$ represent polymer terminating groups, e.g. hydrogen.

As an illustration: A polymer chain with $X_I = C_{12}H_{25}S$ and $X_I = H$ is produced, for example, when radical polymerization is carried out with $C_{12}H_{25}SH$ as a regulator. The groups X and Y are not important influences on the compatibility. Thus, for example, Y may be absent in the case of polymers produced by cross-combination.

In the preceding formulas, A and C represent, independently, a bifunctional group of the type

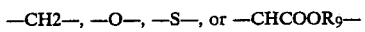

where $R_9$ represents an alkyl, aryl, or alkylaryl group with 2-30 carbon atoms; B and D represent, independently, carbon or silicon; $R_5$ and $R_7$ represent, independently, hydrogen or methyl; $R_6$ and $R_8$ represent, independently, an optionally alkyl-substituted aromatic group with 6-20 carbon atoms, or a group of the type

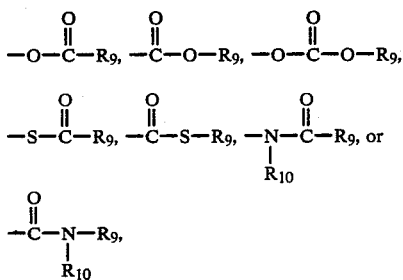

where $R_{10}$ represents a hydrocarbon group with 1-10 carbon atoms, and $R_9$ has the meaning noted above Preferably if B and D are both Si; $R_5$ and $R_7$ are not both hydrogen. If B or D, respective is carbon, A in the former case or D in the latter is $—CHOOR_9—$, or preferably $—CH_2—$. For B or D, respectively being Si preferably A in the former or D in the latter case is $—)—$. If A is a group of type $—CHCOOR_9$, then as a rule C is also a group of type $—CHCOOR_9$. Particularly preferred groups for A and C are $—CH_2—$ or $—O—$.

An important condition for good compatibility of polymer PI-D with polymer PII-D is that group A in PI-D and group C in PII-D occupy much less space than the groups $BR_5R_6$ and $DR_7R_8$ Again, particularly preferred groups for A and C are of the type $—CH_2—$ or $—O—$.

Of course, PI-D and PII-D are chemically disparate polymers, i.e. if $A = C$, $BR_5R_6$ is not equal to $DR_7R_8$.

There is a second condition for good compatibilty of PI-D and PII-D, beside the condition that A and C be the groups occupying the least space in the polymers: It is also necessary that the groups $R_6$ and $R_8$ differ by not more than 2 carbon atoms. Particularly preferred are blends in which $R_6$ and $R_8$ differ by not more than one carbon atom, and especially preferred are blends in which $R_6$ and $R_8$ have the same number of carbon atoms. Also preferred are polyblends in which the degree of branching within the groups $R_6$ and $R_8$ is approximately equal. Thus a system with $A=C=—CH_2—$, $B=D=$ carbon, $R_5=$ hydrogen, $R_7=—CH_3$, and $R_6=R_8=—COO$(n-butyl) has been found to be compatible; whereas with $R_6=—COO$(n-butyl) and $R_8=—COO$(t-butyl), the blend is not compatible.

A further important condition is spatial correspondence of polymers PI-D and PII-D with regard to their sterically hindered side groups.

Thus, in a sense there is a certain similarity between the inventive polyblends and the discovery by H. G. Braun and G. Rehage, in studies of 17 rubber mixtures, that the side chains have the maximum influence on the compatibility (see 1985, Angew. makromol. Chem., 131:107–115).

In a sense the polyblends P1-A/P2-A and P1-C/P2-C are special cases of the general polyblend PI-D/PII-D.

It should be emphasized that the general case of the blend PI-D/PII-D is beyond the special cases mentioned. Thus the blend PI-D/PII-D also encompasses the blend polymethylphenylsiloxane/polystyrene (where A is $—O—$, B is Is, $R_5$ is $—CH_3$, $R_6=R_8=$ phenyl, C is $—CH_2—$, and $R_7$ is H), which is known in the literature.

As a rule one may start with homopolymers PI-D and PII-D. For the purpose of shifting the position of the UCST, comonomers can be copolymerized which by themselves do not lead to compatible polymers. In general this is necessary if the compatibilty of polymers I and II is too good, whereby compatibility is observed even at low temperatures (as with, e.g., polyblend PB-C6 in Table 1). Copolymerization is recommended for this case and for the case of the highly compatible blend P1-C = phenyl methacrylate, P2-C = cyclohexyl (meth)acrylate.

Copolymerization may also be employed to shift the glass transition temperature of the polyblend. As a rule, at least 50 mol%, preferably more than 60 mol%, especially more than 80 mol% of the monomers in the polymers PI and PII should differ from each other.

This can also be accomplished by the addition of plasticizers. As a rule when elasticizers are added the position of the UCST is also changed. Also, the rate of the these transformations at the UCST is influenced by the glass temperature of the polyblend and of the component polymers, as well as by the presence of plasticizers. It is the UCST behavior of the inventive polyblends (PBs) which affords particular application possibilities, in comparison with polyblends which only display LCST behavior.

Advantageous Effects:

Presently accumulated results with the inventively applied polyblends (PBs) indicate the following advantageous effects:

According to studies in hand, the state of polymer systems with UCST can often be set reversibly even at very low temperatures.

The polyblends PB can be employed without problems even at quite high temperatures (e.g. they may undergo extrusion and injection molding). This characteristic enables practical production of systems which Low content of plasticizers, solvents, or softeners;

Closeness of the UCST and Tg for at least one of the polymer components; and

Relatively high UCST.

In systems for reversible information storage, the information (i.e., the change from the clear single-phase region to the cloudy two-phase region, or the reverse of this change) should first be frozen-in, i.e. the clear single-phase region should survive after cooling to below the UCST; but it should be possible to erase the stored information at a later time. As a rule, one can establish such a system in simple fashion by very rapid cooling after the registration of the input information (cooling rate of, e.g., >10° C./sec yields "freezing-in" of information). The information can thereafter be erased by tempering, e.g. for 10 min, at temperatures slightly below the UCST (e.g., UCST -10° C.). In this instance the glass temperature should be in the range UCST - 50° C. to UCST - 100° C. The UCST itself should be, in general, >50° C.

As mentioned, one or more low molecular weight organic substances W may be added to the polyblend which is comprised of at least two disparate polymers.

Advantageously the low molecular weight substance W should be a solvent for at least one of the two polymers P1 and P2.

Also, it is advantageous if the RI of the low molecular weight substance W differs from those of the polymers in the system polyblend (which polymers are P1, P2, and any additional polymers in the system). This enables one to take advantage of a nonuniform distribution of the low molecular weight substance W between the two incompatible polymers, whereby even if the difference in the RI of pure P1 and P2 is small one can produce light-scattering.

In this connection one must take into account that any asymmetry in the polymer-solvent interaction in a ternary system P1/P2/solvent W may result in a phase separation. Therefore, one should generally employ solvents which have only a slight asymmetry in the polymer-solvent interaction. As a rule, the low molecular weight substance W is an organic substance, i.e. it is not water. Preferably the low molecular weight substances W belong to the group of plasticizers, solvents, and/or softeners for polymers (see Gnamm, H., and Fuchs, O, 1980, "Loesungsmittel und Weichmachungsmittel", 8th Ed., Vols. I and II, pub. Wissenschaftliche Verlagsgesellschaft mbH, Stuttgart). Advantageously the low molecular weight substances W have a melting point which is below 10° C., and which advantageously is ≦UCST - 50° C. (the UCST being that of the polymer system comprised of P1, P2, etc.).

In general the content of low molecular weight organic substances W should be in the range 0.1–1000 wt.% preferably 5–300 wt.% based in the weight of the polymers P1 and P2.

Advantageously, the composition of the polymer components of the polyblend should be such that no chemical change occurring in any of the polymers (P1, P2, or any other polymers present) at the temperature of the UCST proceeds at a rate greater than 1%/hr based on the monomer units involved.

The stability of the polymer components may be improved by techniques which are per se known, employing UV protection agents, antioxidants, anti-aging agents, and weather protection agents, etc. (see "Ullmanns Encyclopaedie der techn. Chemie", 4th Ed., Vol. 15, pub. Verlag Chemie, pp. 255ff.). The amount of such agents employed is generally 0.01–5 wt.%, preferably 0.1–1 wt.%, based on the weight of the polyblend. Examples of protective agents are sterically hindered phenols, phosphites, thioethers, sterically hindered amines, benzophenone, benzotriazole, and oxalanilides.

In general, the mean molecular weight $\overline{M}_w$ of at least one of the two polymers (P1 or P2) should be at least 2000, preferably at least 10,000; and preferably the molecular weight of each of the two polymers P1 and P2 should be at least 2000. The molecular weights are determined by known light scattering techniques, see "Houben-Weyl". Advantageously at least one of the polymers has a mean molecular weight $\overline{MHD}$ w in the range 2000–500,000, preferably 10,000–500,000; and it is advantageous if each of P1 and P2 has mean molecular weight in the range 2000–500,000, preferably 10,000–500,000.

Particularly interesting systems result if the component polymers are to some extent covalently interlinked, e.g. P1 linked with P2. Such covalent linkages may be achieved, e.g., by the character of the polymers as block polymers, or by grafting. The mixture ratios given hereinbelow should be taken into account. Often it is sufficient if one of the polymers (e.g. P2) is produced by polymerization in the presence of the other polymer (e.g. P1).

The block polymerization or graft polymerization ma be carried out according to known methods. Reference may be made to the relevant literature for details of the preparation of block and graft copolymers. See, e.g., "Houben-Weyl", loc. cit., Vol. 14/1, pp. 110ff; Allport, D. C., and Janes, W. H., 1973, "Block copolymers", Appl. Sci. Publishers, Ltd., London; Battaerd, J.A.J., and Tregear, G. W., 1967, "Graft copolymers", in "Polym. Revs.", Vol. 16; and Burlant, W. J., and Hofmann, A. S., 1960, "Block and graft polymers", Reinhold Pubs. Corp., N.Y.

The following will serve as guidelines for the mixture ratios in the polymer system PB: Weight ratio of polymer P1 to polymer P2 =98:2 to 2:98, preferably 90:10 to 10:90, particularly preferably 80:20 to 20:80. The polyblend may be colorless or colored.

As a rule, addition of coloring agents serves to increase the contrast in the transition from the single-phase region (at T >UCST) to the two-phase region (T <UCST) and in the reverse of this transition.

The coloring material used is preferably a dyestuff of a type which is per se known and is soluble in the system, or a pigment having discrete pigment particles. For a pigment, the diameter of the particles is preferably ≦50% of the mean diameter of the polymer phase domains which are formed upon deblending of the polymers P1 and P2.

Suitable types of dyestuffs and pigments are indicated in, for example, 1978 "Ullmanns", 4th Ed., Vol. i5, loc. cit., pp. 275–280.

The content of colorant is in the usual range, e.g. 0.01–10 wt.% based on the weight of the polyblend.

The polyblend may be used in various forms.

It may be used directly without a differentiable substrate. For such use it is advantageous if the Tg of the polyblend is >20° C., preferably >50° C. Such a form is particularly practicable for applications involving irreversible information storage. In this case the polyblend will be given the geometric shape, e.g., a disc, a band, or a filament.

Another application form of the polyblend involves use of a supporting substrate. In most cases the polyblend will be applied to the substrate by way of adhesion, possibly with application to both sides of the substrate.

In a third form, the polyblend is disposed between a substrate and a cover layer, wherewith the substrate and cover layer may be identical. As a rule the substrate is comprised of a transparent material; and the cover layer likewise. As a rule they are comprised of the same material and have the same dimensions. For practical reasons, the material used as the substrate should have a glass temperature Tg >50° C. If substrate materials with Tg <50° C. are used, these should be crosslinked.

Thermal stability should be such that it does not interfere with thermal processing of the polyblend; thermal stability should extend to at least 30° C. above the UCST of the system. Candidates for the substrate include transparent inorganic materials, e.g. mineral glass such as silicate glass or IR-permeable glasses based on sulfides, selenides, or tellurides of arsenic or antimony ("chalcogenide glasses"). The latter absorb strongly in the visible spectrum but are transparent in the IR to 10 micron. Alternatively, the substrate may comprise a light-reflecting material, e.g. a metal or a metallized (mirror) surface.

The case of polyblends embedded between a substrate and a cover layer is of particular interest. Generally the substrate and cover layer are not different in nature. Advantageously the polyblend for such applications has Tg < −50° C., which is attainable by polyblends containing plasticizers, solvents, and/or softeners. The embedded form between a substrate and cover layer allows the use of highly mobile polyblends which are thus rapidly reversible. The form is thus used particularly for rapidly changeable display panels, in TV screens and similar systems.

In general the geometric form of the polyblend is not subject to material-specific limitations. When the preparation is used on a substrate or in embedded form, the geometric form assumed by the polyblends will generally conform to that of the substrate and (if present) the cover layer.

The shape of the polyblend whether the polyblend is isolated on a substrate, or embedded, may be, e.g., that of a plate, disc, film, strip, or flexible band.

The substrate and/or cover layer may advantageously be colored, to enable the substrate and/or cover layer to function as, e.g., a filter for incident light.

The polyblends may also be incorporated into a transparent material the refractive index of which corresponds to that of the polyblends at temperatures above the UCST. Advantageously the material used as a matrix has Tg >50° C. The materials suitable for such use may be, e.g., selected from the abovementioned polymers suitable as substrates. In some applications, particularly for the case of optical displays, it is advantageous to heat the entire system (polyblend plus any substrate, cover layer, etc.) to a working temperature slightly below the UCST, e.g. UCST −1° C. to UCST −20° C. in order to minimize inertia in the display system. In this connection it is advisable to minimize the heat capacity of the entire system —thus, to minimize the thickness of information storage media such as plates films, bands, etc., so as to enable rapid switching of states. The minimum thickness of the polyblends PB as such and in their various configurations is determined by the required coherence of the layer and by the difference in transmission above and below the UCST which difference is required from considerations of optics and measurement technology.

In many cases it is sufficient to employ the polyblends in a layer thickness of 0.0001 to ≦1 mm, preferably <0.1 mm, particularly <0.01 mm, wherewith the polyblend may be disposed on a substrate, may be embedded, or may be used without a substrate. A particularly interesting configuration is incorporation of the polyblends into a material the refractive index of which corresponds to the refractive index of the polyblend above the UCST, thus forming a matrix "M". While in general the change in transmission of the polyblend below and above the UCST is exploited for storing, recording, and displaying information, it is also possible, particularly when the polyblend is embedded between a substrate and cover layer, to make use of the change in intensity of the light at an angle (e.g. 90°) to the incident light at T <UCST and T >UCST for registering and transferring information.

Particularly interesting are systems in which the polyblend is incorporated in a matrix material M in the form of discrete particles of diameter 20 nm −200 micron, preferably 50 nm −50 micron. The particle sized can be determined by light microscopy or electron microscopy. (See "Kirk-Othmer", 3rd Ed., loc. cit., Vol. 21, pp. 115–117; and "Houben-Weyl", 4th Ed., loc. cit., Vol. XIV/1, pp. 365–372.) Particularly preferred for such systems are particles with diameter in the range 50 nm −5 micron. It is possible to produce such fine particles by emulsion polymerization of at least one of the polymer components P1 and P2. Of particular interest is a preparation of the polymer components P1 and P2 of the polyblend in an emulsion polymerization method comprising at least two stages. Particularly preferred are methods wherein a latex comprised substantially completely of polymer component P1 is employed as a seed latex for the emulsion polymerization of polymer component P2. It may further be advantageous to employ the abovementioned latex (containing polymer component P1 and/or P2) as a seed latex for the emulsion polymerization of a polymer component PM', which is understood to be a polymer which is compatible with the matrix M, or preferably coincides chemically with the matrix M. This material PM' serves to anchor the polyblend and the matrix M. As a rule the matrix M does not enter into a compatible polyblend with either of the polymer components (P1 or P2) of which the polyblend PB is comprised.

Further, as a rule when the polyblend PB is incorporated as particles in a matrix M, at temperatures above the UCST of the polyblend the refractive index of the polyblend substantially corresponds to the refractive index of the matrix M (as a rule, Δn <0.01). Further, the following two relations hold simultaneously:

$$n_D(M) - n_D(P1) > 0.01, \text{ and}$$

$$n_D(P2) - n_D(M) > 0.01.$$

Preferably, the refractive index of the material employed as a substrate or support satisfies the following relation: $n_D$ (substrate) ≅ $n_D$ (polyblend PB).

It is also useful if the substrate material satisfies the condition $n_D$ (substrate) < $n_D$ (polyblend PB), and further, $n_D$ (substrate) > $n_D$ (polymer P1) and $n_D$ (substrate) 21 $n_D$ (polymer P2).

These are, e.g., display panels, for which light enters in the plane of the panel and light exits only at points where T <UCST. In this connection, the material used for incorporation should preferably have Tg >50° C. For such display panels with light entering in the plane of the panel it is preferred that the front side of the panel be coated with phosphorescing materials. Of particular interest is a configuration wherein the polyblend PB is present in a layer of thickness <0.1 mm, particularly <0.01 mm, which layer is applied to a substrate or is embedded between a substrate and a cover layer.

The thickness of the substrate is determined within certain limits by the choice of the material. In general it is 1 micron to 10 mm, preferably 5 micron to 0.5 mm. When layers not comprised of the polyblend PB are employed, e.g. when the polyblend is incorporated in a matrix or embedded between a substrate and a cover layer, one should attempt to limit the thickness of at least one of these supporting or covering layers to $\leq 0.5$ mm.

For certain applications it may be advantageous to employ the polyblends PB in the form of a filament. In such a case the polyblend PB may form, e.g., the core of the filament, and the surrounding sheath may function as the support.

In the last-mentioned case it is advantageous if the indices of refraction obey the following relations:

$n_D$ (sheath) > $n_D$ (polymer P1) or $n_D$ (sheath) > $n_D$ (polymer P2); and $n_D$ (sheath) < $n_D$ (polyblend PB).

The filament described serves as a light conduit whereby the light conduction can be changed by variation of the temperature (increasing the temperature to T >UCST or lowering the temperature from T >UCST to T <UCST).

The optically readable information according to the invention is based on the use of the polyblend PB in the various stated configurations. The information is registered by clouding as a result of passing through and to a point below the UCST. A wide scale is thus provided for representing and using the information. In carrying out the process, as mentioned above it is advantageous to hold the polyblend PB and the entire system containing the polyblend which system includes the substrate, cover layer, or matrix, at an operating temperature >(UCST −20° C.), preferably >(UCST −5° C.). In this state the polyblend PB and the system containing it are ready for receiving the information.

The polyblend PB in its various configurations may be used, for example, as an information storage device. In this connection it is advantageous if the clarity produced by supplying heat to the device remains constant to the extent that the transmission does not change by more than 5% in one week in relation to the transmission measured after freezing a sample which has been previously heated to above the UCST.

It is possible, as mentioned above, to fix the registered information by freezing the information storage device rapidly, at a rate of >10° C./sec. And information present as a clear point can be eliminated by heating, e.g., heating for 1 hr at UCST −5° C.

An interesting possibility for carrying out the process is to register the information digitally. As stated above, the information may be produced as static or as variable quantities.

An important area of application for the inventive method is in data storage. The information units available for expressing the information are comprised of geometrically limited elements which differ in their light transmission. This enables representation of binary digits, with, for example, one type of bit represented by "light-transmitting" and the other by "non-light-transmitting". The information storage medium can be read by devices which respond to differences in clarity, e.g. with the aid of a photocell.

Additional applications exist in communications and advertising. For example, it is a simple matter to produce symbols such as stylized writing, data, etc., on a display panel. If the rapidly reversible polymer systems described elsewhere herein are employed, they can be used for large-surface display panels or "moving" illuminated signboards.

A desirable precondition for use in display panels is that the information, which is registered by increasing or reducing the cloudiness, be able to be recorded at a rate of $\Delta$transmission/sec >1%, where "$\Delta$transmission" is the percent change in the optical transmission. For this application, advantageously the fadeout time of the information should satisfy the following $\Delta$transmission/min >10%, and preferably, $\Delta$transmission/sec =10%.

For many applications it is desirable for the energy supply to the polyblend PB to be controlled such that one achieves precise spatial and temporal control of the resulting modifications according to the invention. The spatial and temporal distribution of the energy supply may be controlled electrically or optically with the aid of appropriate known apparatus.

Information may be input directly by heat-releasing elements, i.e. heating elements. Advantageously these elements are installed in such a way that the energy supply and withdrawal can be variably controlled spatially and temporally. This enables the production of, e.g., writing flourishes and moving images.

In general it is possible for the surface provided as a support surface for the information to be arranged as a raster screen, as is known in principle from other optical information media. The raster is formed from the number and geometric distribution of the elements "E" capable of energy emission and/or energy transmission, which elements are regarded as pointlike, to a first approximation. Another characterizing parameter is the maximum and the relative power which can be or is emitted by the elements E. The surface extent of the elements E capable of energy transmission depends within certain limits on the requirements placed on the resolution of the information to be reproduced. As a rule of thumb, it may be assumed that an individual element E as, e.g. a heat source, has an energy emitting surface of <10 mm$^2$ preferably $10^{-5}$ to $10^{-1}$ mm$^2$ The experience accumulated thus far suggests that a customary information medium containing the polyblend PB and comprised of panels, plates, or screens, may comprise at least 10,000 independently heated points which are as a rule uniformly distributed. The supports employed for displaying the information, e.g. display panels, image screens, or image plates, may match TV screens of the state of the art, in the raster distribution of elements horizontally and vertically. The support, i.e., the plate itself, may be subdivided such that each of the separately heatable points is resolvable into a red, yellow, or blue element.

The opposite embodiment is also possible (as described above). The polyblend PB in one of the embodiments begins in its initial state by being held at a temperature above the UCST. The information can then be registered by shutting off individual point energy-transmitting elements E, or by controlled energy withdrawal, e.g. by pointwise cooling to temperatures below the UCST, e.g. with the use of pressurized gas, e.g. compressed air or the like. In such a case the operating temperature is preferably at least above the UCST. Solar energy, for example, may be employed to maintain the operating temperature in such a case.

According to the invention, thermal energy can be supplied to the polyblends PB by all known means in the art, adapted to the objective of directed, controllable energy emission.

In many cases the thermal energy to be emitted will be produced by conversion of energy which is originally electrical. For example, one may make use of heat produced when a current passes through a material (resistance heat), or energy transmitted by radiation, which energy is possibly converted (e.g. IR, light, or microwave).

A particularly practical possibilty is the use of lasers, which are known to provide intense, coherent, monochromatic, and readily collimated radiation. Particularly suitable for use are lasers of types used in materials processing and in medicine, particularly ruby lasers, argon lasers, YAG (yttrium-aluminum-garnet)/Nd lasers, and glass/Nd lasers (see Ross, "Laser applications", pub. Academic Press, N.Y.; and Ready, 1978, "Industrial applications of lasers", pub. Academic Press, London). Semiconductor diode lasers are also suitable for use. The energy output in each case of an energy source and an element E is adjusted to produce the desired effect. The UCST is of course a factor as well.

In addition to these optically differentiable modifications of the information medium by phase transformation from a de-blended system of polymers P1 and P2 below the UCST to a compatible polymer system above the UCST, or the reverse of this transformation, in which modifications the chemical structures of the polymers P1 and P2 remain unchanged, there is also of interest a mode of modification of the information medium wherein the compatibility of the polymers, i.e. the position of the UCST itself, is changed by energetic effects. Conceptually, this involves polyblends in which at least one of the polymers contains a group which undergoes a change of configuration upon irradiation, for example, with UV light. Such a group may comprise, e.g., a compound with cis-trans isomeric forms, e.g. cinnamic acid, with the configuration changing upon irradiation (conversion of trans-form to cis-form by UV irradiation).(1) Other groups are, e.g., azo groups, fumaric acid/maleic acid rearrangements, and stilbene derivatives.

(1) c.f. G. H. Brown, Ed. Techniques of Chemistry Volume III, Photochromism, Wiley Interscience, 1971.

These or similar systems may be added to the polyblend as photoactive plasticizers, and may influence the position of the UCST by their transformations. They may also be copolymerized (to minor degrees, e.g. between 2 and 50 wt.%) into polymer P1 or P2. The photoinduced transformation causes the compatibility to shift, and thereby the UCST. This technique is particularly effective with polymer systems having a UCST, because in polyblends with UCST the compatibilty depends very strongly on the spatial structure of the polymers (see discussion above).

The optically differentiable modification of the information medium (in this case via local shifting of the position of the UCST) may be carried out by means analogous to those recorded recently in connection with variation of the position of the LCST (Irie, M., and Iga, R., 1986, *Macromol. Chem. Rapid. Commun.*, 7:751-754).

Apart from this case (shifting of the position of the UCST by optically induced configuration of one of the two polymers), in general, information input and erasure are accomplished without modification of the polymers P1 and P2 of which the blend is comprised.

Switching and Control:

The energy supply in practice is provided chiefly by:
(a) Light;
(b) Thermal radiation; or
(c) Electrically generated heat.

In all cases, options for switching, control, and circuitry can be drawn from known models. In particular, heating by means of light (a) may be accomplished by laser or fiber optic cables.

For a large display panel, a relatively complex system is required for spatial and temporal control. The same applies to the information display on a TV screen. For use as a simple illuminated signboard it is sufficient for producing a moving image to, for example, actuate heating wires in a timed sequence, whereby said wires can be mounted at the surface so as to transfer energy in the pattern of a uniform raster, or other pattern.

The light scattering which occurs when the elements are transformed from the clear single-phase region to the two-phase region of course depends on, among other things, the size of the domains of deblended polymers P1 and P2 which are formed. This domain structure can be regulated by, e.g., mutual cross-adding of polymer grafts of the two polymer types.

Further, such domains can be regulated by, e.g., employing one of the two polymers in the form of a weakly crosslinked particle, e.g. a latex particle, and thereby controlling the characteristics of the clouding.

Configurations of the Polymer Blends PB:

The polyblend PB, which may contain low molecular weight substances W in the form of plasticizers, solvents, and/or softeners, may be applied to a substrate.

The polyblend PB, which again may contain low molecular weight substances W in the form of plasticizers, solvents, and/or softeners, may be employed as an adhesive agent to join the substrate and a cover layer. (As a rule the substrate and cover layer are comprised of the same material.) The embedding between substrate and cover layer may be accomplished after the fashion of a monomer/polymer ("mopo") system.

The polyblend PB may be formed by co-precipitation, and applied as such to the substrate, particularly by press means.

Various methods of the plastics industry are suited to processing and machining of the polyblend PB. In employing such methods, the physical and chemical parameters of the polyblend are taken into account (e.g. Tg, UCST, thermal stability, etc.).

Thus, for example, the polyblend PB may be produced or undergo forming by injection molding. In other cases the polyblend PB may be produced or undergo forming by extrusion. Extrusion may be employed, e.g., to apply the blend to a substrate.

As mentioned above, polyblends which satisfy the conditions applicable to the present invention may be discovered by a directed systematic approach.

The polymers are manufactured by means which are per se known. In the case of polyvinyl compounds, the preferred method of preparation is radical polymerization.

Other features of the invention will become apparent in the course of the following descriptions of exemplary embodiments which are included for illustration of the invention and are not intended to be limiting thereof.

EXAMPLES

Example 1

Ice warning label or placard, based on polyblends with UCST.

200 g polybutyl methacrylate was dissolved in 800 g butyl acrylate and polymerized with the addition of 0.5% of a crosslinking agent. The result was a highly transparent, colorless plate 3 mm thick, from which letters forming the words "Vorsicht Eis" (in English, "Caution ice") were cut out. These letters were adhesively attached to a brilliant red plate. At room temperature this plate is brilliant red. At T <0° C. the plastic letters are white. Thus, under cold conditions the white warning "Vorsicht Eis" can be read on the red background.

Example 2

Table 2 contains data on polyblends with UCST, which blends are suitable according to the invention for registering optically readable information.

To prepare the polyblends listed in Table 2, in each case 20 wt.% of the corresponding polymer, which is a polymethacrylate prepared with the use of regulators, was dissolved in an acrylate monomer (comprising 80 wt.% of the total weight of the blend), and polymerization was carried out with addition of t-butyl perneodecanoate in the amount of 0.1 wt.%.

The polyblends were all clear under heating, but were cloudy at low temperatures (positions of the UCSTs given in Table 2).

TABLE 2

| Polyblends with UCST. | | | |
|---|---|---|---|
| First-given polymer is the polymethacrylate present in the amount of 20 wt. %. Second-given polymer is the polyacrylate present in the amount of 80 wt. %. | Compatibility at | | |
| | −15° C. | +25° C. | +120° C. |
| Polyethyl MA/polyethyl A: | u | − | + |
| Polybutyl MA/polybutyl A: | − | + | |
| Polydecyl MA/polydecyl A: | u | − | + |
| PolyCH MA/polyCH A: | − | + | |
| PolyIB MA/polybutyl A: | − | −/+ | |

TABLE 2-continued

| Polyblends with UCST. | | | |
|---|---|---|---|
| First-given polymer is the polymethacrylate present in the amount of 20 wt. %. Second-given polymer is the polyacrylate present in the amount of 80 wt. %. | Compatibility at | | |
| | −15° C. | +25° C. | +120° C. |
| Polybutyl MA/polyIB A: | u | − | + |
| PolyIB MA/polyIB A: | u | − | + |
| PolyEH MA/polyEH A: | u | − | + |

MA = methacrylate
A = acrylate
CH = cyclohexyl
IB = isobutyl
EH = 2-ethylhexyl
+ = compatible
− = incompatible
u = no data

Example 3

Use of polyblend "PB-C1".

Figure 3:
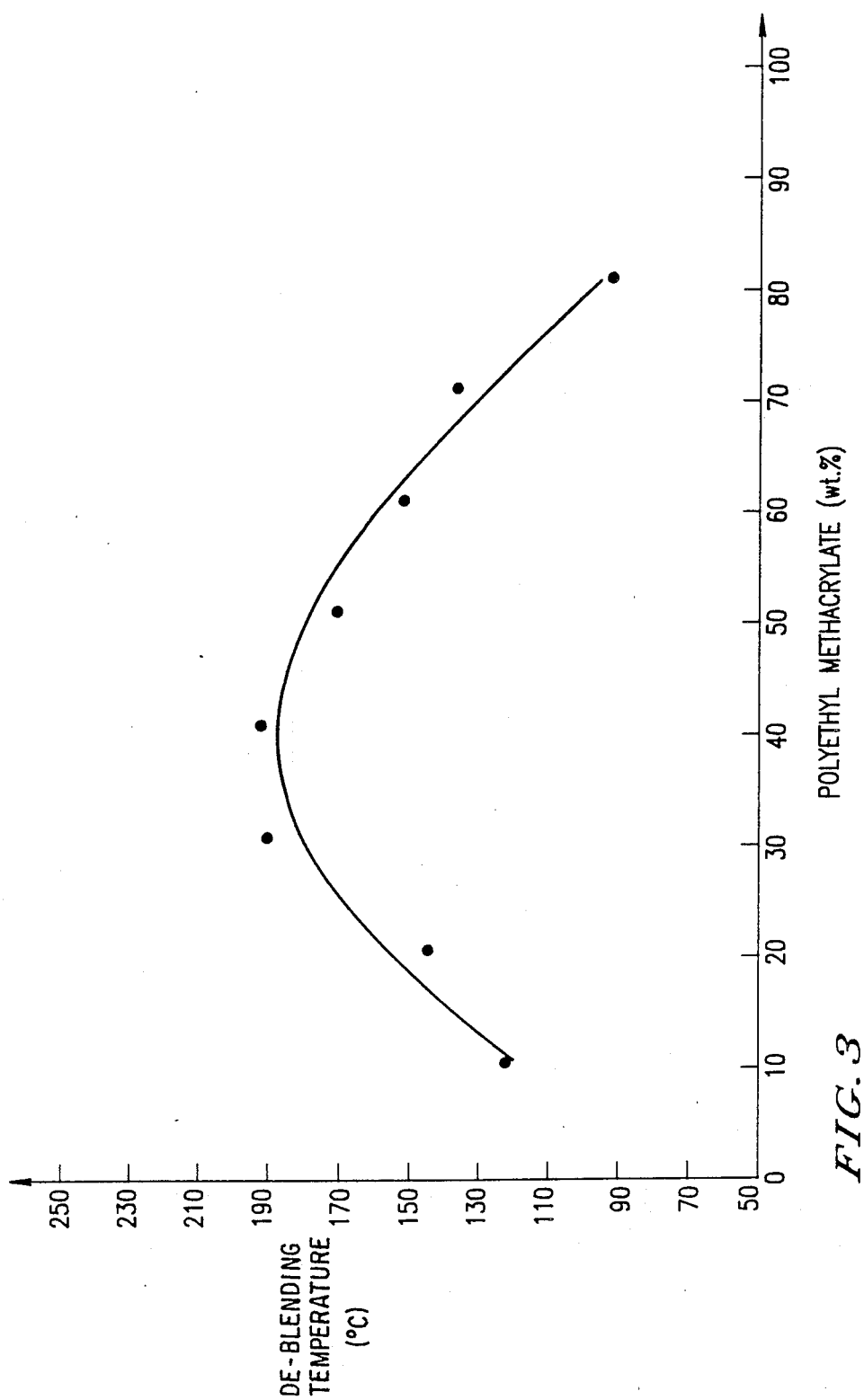
FIG. 3 is a phase diagram of polymer blend PB-C1.
Figure 4:
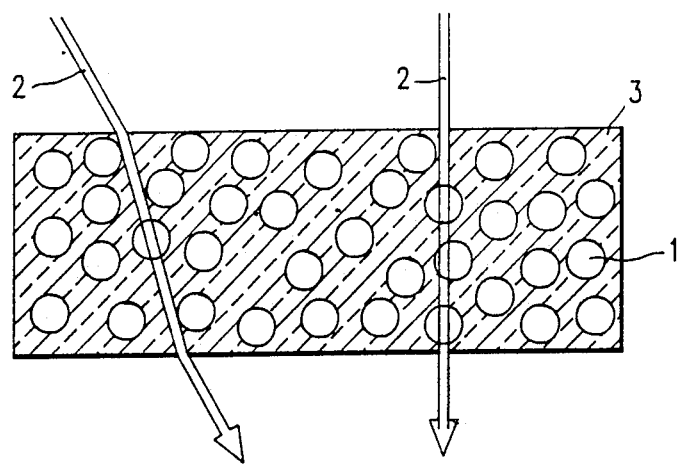
FIG. 4 illustrates an embodiment of the present invention in which polyblend particles (1) having a particle size of about 1 micron are incorporated in a matrix material (3). When warmed to a state in which the temperature is greater than USCT, the refractive index of the matrix equals the refractive index of the polyblend and light will be transmitted at all angles of the incident light beam (2). The overall material is transparent.
Figure 5:
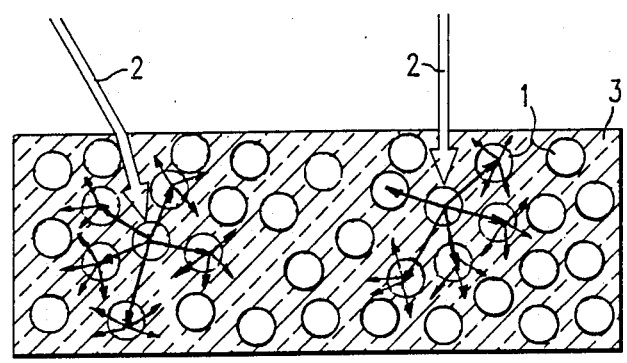
FIG. 5 shows the material of FIG. 4 at a temperature below the UCST. The polyblend particles are in a de-blended state and the refractive indices of the polyblend particles and the matrix are different from one another. Incident light is scattered and the overall visual appearance is white.
Figure 7:
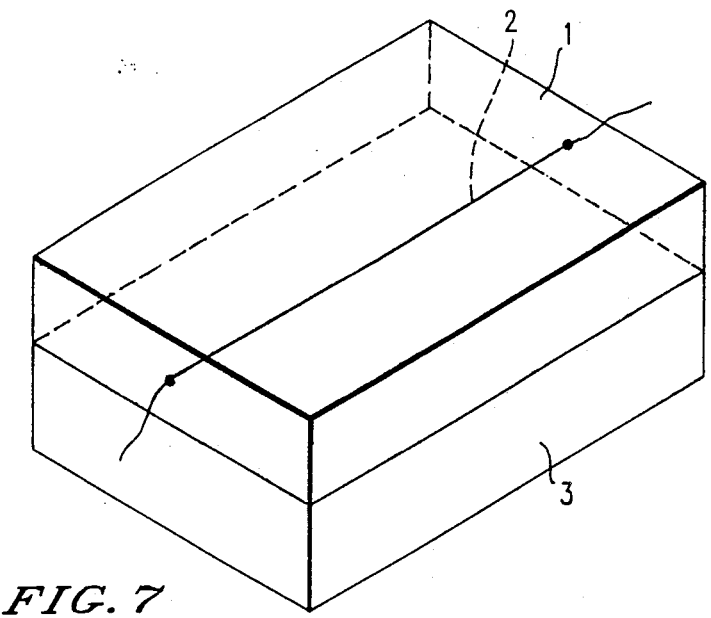
FIG. 7 illustrates a sign device (polyblend in de-blended state (1), heating wire, not heated (2), substrate (3)). When the heating wire is at ambient temperature, the entire polymer blend is in the deblended state and the entire sign has a white appearance.
Figure 8:
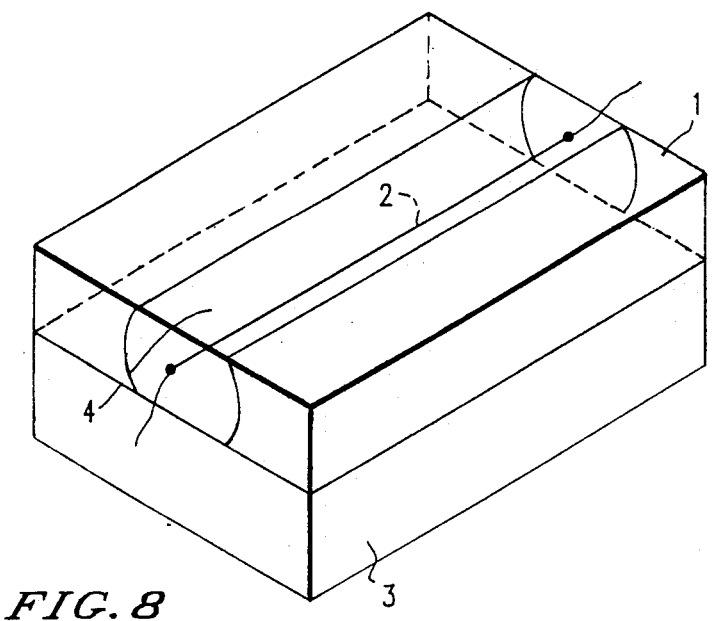
FIG. 8 illustrates the sign device of FIG. 7 after the heating wire is heated (2) to form a polymer blend in the compatible state having a temperature above UCST adjacent to the wire (4).

Polyethylmethacrylate and polyethylacrylate were each dissolved in toluene to form 20% solutions. The polymer solutions were then mixed in ratios from 10:90 to 90:10. A film was produced on a glass plate, from each of these mixtures, and was dried in vacuum. FIG. 3 shows the phase diagram of the thus prepared polyblend. As may be seen, when the concentrations of polyethylacrylate and polyethylmethacrylate are approximately the same, compatibility occurs only at elevated temperatures. Thus, this polyblend displays UCST behavior.

The phase transformation at the UCST for this polyblend is reversible, and thus the blend may be used (in combination with heating elements controlled according to spatial and temporal variables) in an advertising signboard having an illuminated panel with moving image.

Example 4

Characterization of polyblend "PB-C4".

The intrinsic viscosities J hereinbelow were measured according to IZOD 1628-6 or DIN 7745-II Sec. 3.

Polycyclohexylacrylate (J = 23 ml/g) and polycyclohexylmethacrylate (J = 28 ml/g) were each dissolved in toluene to form 20 wt.% solutions. These solutions were then mixed in weight ratios of 90:10, 70:30, 50:50, 30:70, and 10:90. Films were produced from the mixtures by film casting, and were dried in vacuum. All the mixing ratios resulted in clear films. The glass transition temperatures (Tg) of the thus produced polyblends were determined by DSC. For all mixing ratios only a single glass transition temperature was found. As may be seen from FIG. 2 the glass transition temperature is a function of the composition of the polyblend. Accordingly, the Tg may be considered evidence of the compatibility of the polyblend PB-C4, along with the optical evaluation of the polyblend, namely that the polyblend is transparent.

The determination of the glass transition temperature Tg to demonstrate the compatibility of the polyblends PB may advantageously be accomplished by DSC (differential scanning calorimetry) (see Turi, E.A., ed., 1981, "Thermal characterization of polymeric materials", pub. Academic Press, N.Y., pp. 169ff.).

Because of the very good compatibility of polyblend PB-C4, it is recommended that at least one of the polymers be modified by copolymerization with a monomer of a different type, e.g. methyl acrylate, in order to reduce the compatibility and thereby increase the UCST.

Obviously, numerous modifications and variations of the present invention are possible in light of the above teachings. It is therefore to be understood that within the scope of the appended claims, the invention may be practiced otherwise than as specifically described herein.

We claim:

1. A method for recording, storing, and displaying optically readable information in a plastic material which can be modified in an optically differentiable way under the action of thermal energy, or a form of energy directly convertible into thermal energy, comprising the steps of:
   preparing a plastic material comprising a polyblend mixture, said polyblend mixture comprising at least two disparate polymers which are mutually compatible, said polyblend mixture having an upper critical solution temperature UCST;
   modifying said plastic material in an optically differentiable manner to store information by inducing a phase transformation from a compatible single-phase mixture system above the UCST to a de-blended two-phase mixture system comprising individual polymer domains of the disparate polymers below the UCST; or modifying said plastic material by inducing the reverse phase transformation from said de-blended system to said compatible system.

2. The method of claim 1, wherein the transition from said single-phase system to said two-phase system is brought about by lowering the temperature of said plastic material and said reverse transition is brought about by raising the temperature of said plastic material.

3. The method of claim 1, wherein said polyblend is comprised of at least two disparate polymers, and wherein the refractive indices of said disparate polymers differ by at least 0.005.

4. The method of claim 3, wherein the refractive indices of said disparate polymers differ by at least 0.01.

5. The method of claim 1, wherein said polyblend has a UCST below 300° C.

6. The method of claim 5 wherein said polyblend has a UCST below 140° C.

7. The method of claim 6, wherein said polyblend has a UCST below 100° C.

8. The method of claim 2, wherein a temperature increase from UCST $-10°$ C. to UCST $+10°$ C. causes the optical transmission to increase by at least 20%, with the determination being made on an unpigmented sample 0.1 mm thick.

9. The method of claim 2 wherein, the optical transmission of the sample throughout the temperature range from UCST $+10°$ C. to at least UCST $+50°$ C. is $\geq 80\%$.

10. The method of claim 2, wherein; the optical transmission is reduced by at least 20% in a temperature interval of $<10°$ C.

11. The method of claim 2, wherein said temperature lowering or raising is accomplished at $>1°$ C./sec.

12. The method of claim 11, wherein said temperature lowering or raising is accomplished at $>10°$ C./sec.

13. The method of claim 11, wherein said temperature lowering or raising is accomplished at $>10°$ C/0.1 sec.

14. The method of claim 1, wherein two polymer phases coexist in said de-blended state below the UCST, at least one phase having a domain size in the range 10 $nm^2$ to $10^8$ $nm^2$, and the refractive indices of said polymer phases differ by at least 0.01.

15. The method of claim 14, wherein at least one polymer phase has a domain size in the range 100 $nm^2$ $-10^6$ $nm^2$.

16. The method of claim 1, wherein the glass transition temperature Tg of said polyblend is below 150° C.

17. The method of claim 16, wherein the glass transition temperature Tg of said polyblend is below 100° C.

18. The method of claim 16, wherein the glass transition temperature Tg of said polyblend is below 50° C.

19. The method of claim 16, wherein the glass transition temperature Tg of said polyblend is below 0° C.

20. The method of claim 16, wherein the glass temperature Tg of said polyblend is below $-50°$ C.

21. The method of claim 1, wherein said polyblend further comprises at least one low molecular weight substance.

22. The method of claim 21, wherein said low molecular weight substance is added to said polyblend in the amount of 0.1 to 1000 wt.% based on the weight of said disparate polymers.

23. The method of claim 22, wherein said low molecular weight substance is added to said polyblend in the amount of 5 to 300 wt.%.

24. The method of claim 21, wherein said low molecular weight substance has a melting point $<10°$ C.

25. The method of claim 1, wherein the temperature difference between the UCST and the glass transition temperature Tg of said polyblend is at least 20° C.

26. The method of claim 1, wherein the Tg of said polyblend is $\leq$ UCST $-50°$ C.

27. The method of claim 26, wherein the Tg of said polyblend is $\leq$ UCST $-100°$ C.

28. The method of claim 21, wherein said low molecular weight substance is a solvent for at least one of said disparate polymers.

29. The method of claim 21, wherein said low molecular weight substance does not have the same refractive index as said disparate polymers.

30. The method of claim 1, wherein said polyblend contains anti-aging or UV-protective agents in amounts of 0.01–5 wt.%.

31. The method of claim 1, wherein at least one of said two disparate polymers has a mean molecular weight of at least 2000.

32. The method of claim 31, wherein each of said two disparate polymers has a mean molecular weight of at least 10,000.

33. The method according to claim 31, wherein at least one of said two disparate polymers has mean molecular weight in the range 2000 to 500,000.

34. The method of claim 31, wherein at least one of said two disparate polymers has a mean molecular weight in the range 10,000 to 500,000.

35. The method of claim 1, wherein at least 0.1 wt.% of the first of said disparate polymers is covalently bonded to the second of said disparate polymers.

36. The method of claim 35, wherein said first polymer is covalently bonded to said second polymer as a result of a block structure or grafting.

37. The method of claim 1, wherein the mixture ratio of said two disparate polymers in said polyblend is in the range 98:2 to 2:98 by weight.

38. The method of claim 37, wherein the mixture ratio is in the range 90:10 to 10:90 by weight.

39. The method of claim 37, wherein the mixture ratio is in the range 80:20 to 20:80 by weight.

40. The method of claim 1, wherein said polyblend is colored.

41. The method of claim 40, wherein a soluble dyestuff is employed to produce the color.

42. The method of claim 40, wherein a pigment is employed to produce the color, wherein the pigment particles have a diameter $\leq 50\%$ of the mean observed diameter of the polymer phase domains formed upon deblending.

43. The method of claim 1, wherein said polyblend is employed directly, without a substrate or support.

44. The method of claim 1, wherein said polyblend is disposed on a substrate.

45. The method of claim 44, wherein said polyblend is adhesively bonded to a substrate.

46. The method of claim 44, wherein said polyblend is embedded between a substrate and a cover layer.

47. The method of claim 44, wherein said substrate is comprised of a transparent inorganic material selected from the group consisting of silicate glass and chalcogenide glass.

48. The method of claim 44, wherein said substrate is comprised of a transparent plastic.

49. The method of claim 48, wherein said transparent plastic is selected from the group consisting of acrylic resins, cellulose acetate, reclaimed cellulose, polyamide, polyester, PVC, polyolefin, polyglycol, polyacetal, polysulfone, polysulfide, polyether, polycarbonate, and poly(4-methyl-1-pentene).

50. The method of claim 44, wherein said substrate is colored.

51. The method of claim 1, wherein said polyblend has the geometric form of a plate, disc, or band.

52. The method of claim 1, wherein said polyblend has a layer thickness of $<1$ mm.

53. A method of claim 52, wherein said polyblend has a layer thickness of $<0.1$ mm.

54. The method of claim 53, wherein said polyblend has a layer thickness of $<0.01$ mm.

55. The method of claim 1, wherein said polyblend is incorporated in a matrix material.

56. The method of claim 55, wherein above the UCST, the refractive index of the matrix material coincides with the refractive index of said polyblend.

57. The method of claims 44 wherein said substrate has a thickness $\leq 0.5$ mm.

58. The method of claim 55, wherein said matrix has a thickness of $\leq 0.5$ mm.

59. The method of claim 1, wherein said polyblend has the form of a filament.

60. The method of claim 56, wherein said polyblend is incorporated in a matrix material said polyblend being present in the form of discrete particles with diameters in the range 20 nm to 200 micron.

61. The method of claim 60, wherein said polyblend is incorporated in a matrix material said polyblend being present in the form of discrete particles with diameter in the range 50 nm to 50 micron.

62. The method of claim 61, wherein said discrete particles have a diameter in the range 50 nm to 5 micron.

63. The method of claim 1, wherein at least one of said disparate polymers has been prepared by emulsion polymerization.

64. The method of claim 1, wherein all of said disparate polymers have been prepared by emulsion polymerization.

65. The method of claim 64, wherein emulsion polymerization has been carried out according to the core-and-shell principle, whereby a latex comprised substantially completely of a first disparate polymer is used as a seed latex for emulsion polymerization of a second disparate polymer.

66. The method of claim 65, wherein emulsion polymerization is carried out in a process comprised of at least three stages, comprising in succession:
 (i) polymerization to form said first polymer
 (ii) polymerization to form said second polymer, and
 (iii) polymerization to form a third polymer said third polymer being a polymer material which is compatible with said matrix, and preferably is chemically the same as said matrix.

67. The method of claim 55, wherein the following conditions are satisfied:
 $n_D$ (matrix) - $n_D$ (first disparate polymer) $>0.01$;
 $n_D$ (second disparate polymer) - $n_D$ (matrix) $>0.01$;
 $n_D$ (matrix) $= n_D$ (polyblend).

68. The method of claim 1, wherein said polyblend is kept at a temperature of $\leq$ UCST - 20° C. before said modify step.

69. The method of claim 1, wherein the transparence of said polyblend, said transparence being developed by bringing the temperature of said polyblend to a level above the UCST, is frozen-in by cooling said polyblend at a rate of at least 10° C./sec.

70. The method of claim 1, wherein the transparence of said polyblend, said transparence being developed by bringing the temperature of said polyblend to a level above the UCST, is eliminated by heating said polyblend to UCST $-20°$ C. to UCST $-1°$ C. for a period of less than 1 hr.

71. The method of claim 1, wherein said modifying step is performed digitally.

72. The method of claim 1, further comprising
reading said stored information with an optical device.

73. The method of claim 72, wherein the information is read with a photocell.

74. The method of claim 1, wherein said modifying step is brought about by a structural change in at least one of said two disparate polymers by a shift in the UCST.

75. The method of claim 74, wherein said change in one of said two disparate polymers is a light-induced cis-trans configuration change.

* * * * *